SATURABLE REACTOR CIRCUIT

Filed March 18, 1955

INVENTORS
STEVEN J. HUSS
GORDON W. JOHNSON
ROBERT E. WESSLUND
BY
Cushman, Darby & Cushman
ATTORNEYS United States Patent Office 2,889,541

Patented June 2, 1959

2,889,541

SATURABLE REACTOR CIRCUIT

Steven J. Huss, Minneapolis, Robert E. Wesslund, St. Paul, and Gordon W. Johnson, Minneapolis, Minn., assignors to Sperry Rand Corporation, a corporation of Delaware Application March 18, 1955, Serial No. 495,271

17 Claims. (Cl. 340—174)

This invention is concerned with equipment for producing signals useful in recording information on a magnetic recording surface and other purposes. The invention is particularly adaptable to writing digital data magnetically by using a magnetic core as a saturable reactor storage unit and gate for energizing a magnetic recording head with a record signal.

The general theory of magnetic recording is well known in the art. A suitable description of a representative digital magnetic recording system is to be found in United States Patent 2,540,654, issued February 6, 1951, to A. A. Cohen et al. Further information regarding magnetic recording techniques may be found in United States Patent 2,617,705, issued November 11, 1952, to J. M. Coombs et al. The techniques disclosed in these patents apply, with suitable modifications which will be apparent to those skilled in the art, to the circuits and equipment disclosed in this application.

Basically, the present invention uses a magnetic core unit as a saturable reactor gate to energize a load such as a recording head. However, the core unit functions not only as a gate but also as a current amplifier, and a storage insertion register. This allows a considerable reduction in the number of vacuum tubes which would otherwise be required to record and store information on a magnetic medium.

The value of saturable reactors comprised of suitably wound small cores of ferromagnetic material for use as storage and logical elements in electronic data handling systems is being increasingly recognized, particularly because of their miniature size, low power requirements, dependability, and their ability to retain stored information for long periods of time in spite of power failure. The cores of such reactor elements are able to store binary information in the form of residual magnetization after the cores are magnetized to saturation in either of two directions. The saturation can be achieved by passing a current through a winding on the core. When the magnetomotive force thus created is opposite in polarity to the direction of the pre-existing residual magnetic induction, the direction of the static residual magnetization of the core is reversed. The resultant change in flux produces a sizable voltage pulse across every winding on the core, which pulse may be utilized in a variety of ways, such as to drive a second saturable element to saturation in a predetermined polarity. On the other hand, the application of a magnetomotive force which merely drives a reactor element further into saturation in the same direction as that of the residual flux existing prior to its application produces a change in flux which is small compared to that created in a reversal of flux polarity, so that a correspondingly small voltage pulse is induced in each winding on the core.

In order to achieve a large ratio between voltage pulses induced in switching the magnetic polarity of a saturable reactor element as compared to that obtained in driving it further into saturation in the direction of its pre-existing residual magnetization, the core material is preferably one having at least a quasi-rectangular hysteresis characteristic so that the residual flux density is a relatively large percentage of the flux density present during the application of a saturating magnetomotive force. A number of suitable magnetic materials are available such as Deltamax, 4–79 Permalloy, and certain ferromagnetic ferrites. In order to improve high-frequency response by reducing eddy current losses, metallic ferro-alloys are preferably used in thin strips which may be wrapped around ceramic spools while ferrite cores may be molded and windings placed directly thereon, inasmuch as ferrites are relatively free from eddy current effects.

While saturable reactor elements can be used extensively as storage and switching elements in electronic data-handling systems, they cannot by themselves entirely eliminate vacuum tubes or similar apparatus because saturable reactor elements are current-driven devices and so must be associated with suitable current-generating means. Accordingly, a great many logical circuits employing reactor elements and vacuum tubes or transistors in close interrelation are being utilized, with the reactor elements serving to store information and the vacuum tubes or transistors used to switch the information.

In practice of this invention, the most satisfactory results will be achieved when the material composing the magnetic core has a hysteresis characteristic which approximates an ideal rectangular loop.

Numerous advantages will be realized in the practice of the invention as disclosed herein. As mentioned above, a great saving in circuitry and equipment over conventional writing circuits used in recording magnetic digital information as realized. One core acts both as a storage insertion register and as a gate. The driving pulse, which is used as explained hereinafter to effectively energize the writing head, is readily developed from the coincidence pulses which are invariably present in the sort of digital recording equipment in which this invention may be used. Since the circuit acts as a current amplifier, the driving pulse can be held to a relatively low amplitude. Only one electron tube is required for several writing circuits, where previously several tubes were used for each writing circuit. A further valuable use of the invention lies in writing information which is obtained from a source such as transistors, because even a small information pulse controls a large writing pulse. The writing circuit is capable of successful operation at high repetition rates: as high as 275,000 recordings per second have been achieved, and the invention is undoubtedly capable of being employed at still higher repetition rates.

Although this invention is particularly adaptable to magnetic recording and the description herein proceeds relative thereto, the invention may be used in conjunction with any type load wherein current pulses may be utilized. No limitation to the use of the saturable reactor circuit with a recording transducer, for example, is intended.

Therefore, the principal object of this invention is to provide saturable reactor means for storing and gating signals to an output load in accordance with appropriate input signals to said means.

It is another object of this invention to provide apparatus for a writing circuit for magnetic digital data recording which is comprised of a single electron tube as a driving pulse source, a magnetic saturable reactor and a diode.

It is a further object of this invention to provide apparatus for a writing circuit for magnetic recording of digital data which combines the functions of a storage insertion register and a gate in one saturable reactor.

It is still another object of this invention, in a circuit for magnetic recording of digital data, to provide control of a large writing signal by utilizing only a small information signal, and thereby eliminating the necessity of special amplifiers or vacuum tube pulse forming circuits.

It is a further object of this invention to provide saturable reactor writing circuit means capable of altering a prior digital recording or positively and selectively recording digital data.

Still another object of this invention is to provide, for different simultaneous recordings, more than one set of saturable reactor writing circuit means operative from a common single vacuum tube current generator driving signal source.

Further objects and the entire scope of the invention will become apparent from the following description. The invention may best be understood by referring to the accompanying drawings, wherein exemplary embodiments of the invention are shown:

Figures 1, 2, 2A, 3, 4A, 4B:
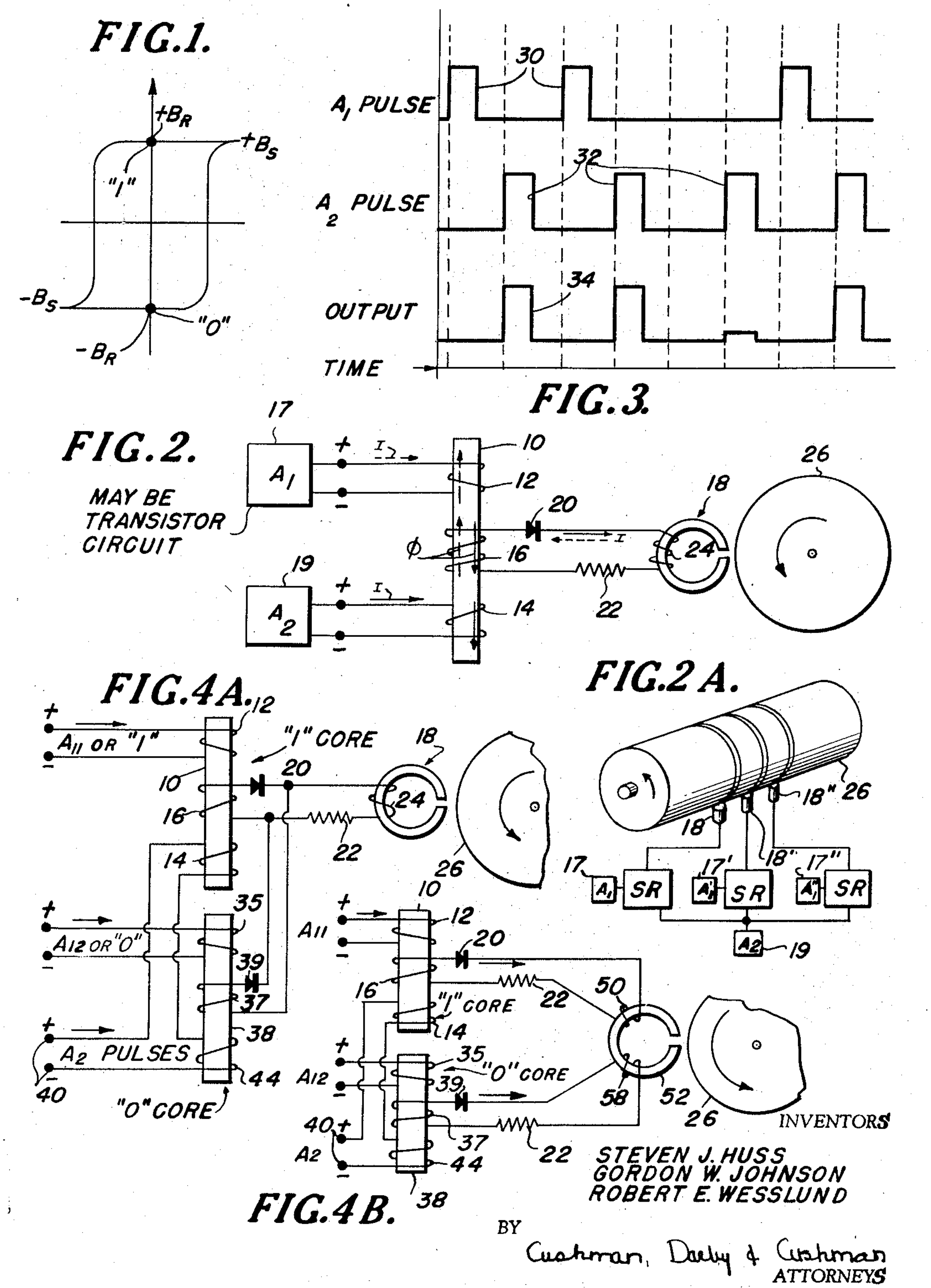
Figure 1 is a graphical representation of the hysteresis loop of a magnetic core.
Figure 2 illustrates a magnetic core writing circuit according to the practice of this invention in cooperation with a magnetic recording drum.
Figure 2A illustrates the invention as applied to several recording heads.
Figure 3 illustrates the time relation between the interlaced driving pulses and output pulses resulting from the practice of this invention.
Figure 4A shows an alternative embodiment of the invention for selective writing or alteration, in which the circuit cooperates with a magnetic head using but a single winding thereon.
Figure 4B illustrates another circuit similar to that of Figure 4A, this time cooperating with a magnetic head having two windings thereon.

In the graph of Figure 1, the horizontal axis represents the magnetizing force (H) applied to a core, and the vertical axis represents magnetic induction (B) resulting within the core. $+B_s$ is the maximum value of the magnetic induction in the core when there is applied sufficient M.M.F. to completely saturate the core in the arbitrarily designated "positive" direction. $+B_r$ is the remanent induction, the state to which the magnetization of the core returns when the M.M.F. is removed. $-B_s$ and $-B_r$ represent similar quantities but in the opposite or "negative" direction of magnetization. A large positive magnetizing pulse will leave a core with positive residual magnetization as represented by the point "1" in Figure 1. A large negative magnetizing pulse will leave the core in the opposite state "0." These two stable magnetic states make it possible to store a binary digit. During the switching period from $+B_R$ to $-B_R$ (or vice versa), maximum flux change occurs. Driving the core further into saturation in the same direction with magnetizing pulses produces very little more flux change.

Referring to Figure 3, data-handling equipment utilizing saturable reactors and inductors as logical elements is customarily supplied with so-called "advance" current signals, such as the pulses designated for the upper row of pulses as $A_1$ and for the middle row of pulses as $A_2$, occurring alternately in time but separated by short quiescent periods. With respect to a given magnetic core, these "advance" pulses may either be applied directly to windings on the core to energize it to a state of positive or negative magnetization, or they may be reserved for timing purposes, and in the latter event they serve to gate similarly timed pulses to the windings.

Referring now to Figure 2, the core 10, as used in this invention, is preferably toroidal in shape and has three windings: a set-up or input control winding 12 which may receive the $A_1$ signals, an input driver winding 14 which may receive the $A_2$ signals, and an output winding 16. As shown in Figure 2, the direction of winding of the driver and output windings is the same while the control winding is wound in opposition thereto. However, this is only an exemplary illustration and as pointed out in detail hereinbelow the direction of the windings may be different. Connected at the input terminals of the control and driver windings, respectively, are current pulse generators 17 and 19 which supply the advance signals $A_1$ and $A_2$ respectively. It is assumed throughout this description for purposes of explanation that the $A_1$ and $A_2$ signals are positive pulse excursions as shown in Figure 3, with the upper of the input lines being more positive than the lower input lines, but as will be apparent to those skilled in the art, this invention is not limited thereto. Current pulses applied to the control winding 12 set the magnetic induction of the core 10 to the $+B_R$ state. Current pulses applied to the driver winding 14 drive the core's magnetic induction back to the $-B_R$ state. The output winding 16 is connected to a load such as recording head or transducer 18 through a unidirectional current conducting device such as diode 20. A resistor 22, in the order of one ohm, may be used with an oscilloscope to view the output or writing current pulse through the head 10 but is, therefore, not a functional or necessary part of the circuit.

The core 10 with its windings is shown in Figure 1 as a straight bar for ease of representation, but it will be understood that core 10 and its homologues in Figures 4A and 4B represent the conventional core of a saturable reactor.

Positioned adjacent to the recording head 18 is a revolving cylindrical drum 26 of non-magnetic material, having a magnetizable coating or layer thereon, the same being situated out of contact at a head-to-drum spacing of approximately 0.002 inch.

When an $A_1$ pulse sets the magnetic induction of the core in the $+B_R$ or "1" state, a change in flux is produced and an E.M.F. is induced in the output winding 16. However, the normally resultant current flow in output winding 16 (dotted arrow, Figure 2) is blocked by diode 20 when the diode is polarized as illustrated in Figure 2. The core 10 remains in the "1" state until an $A_2$ pulse is applied to the driver winding 14, at which time the core 10 is driven back to the $-B_R$ or "0" state. The E.M.F. induced in the output winding 16 causes current to flow in the forward direction of the diode 20, and an output current pulse is obtained in the recording head winding 24. If the core 10 is originally in the "0" state when an $A_2$ pulse occurs, only a very small output is obtained, since the change of flux produced is only that from $-B_R$ to $-B_S$ (see Fig. 1), and this output is insufficient to magnetize the recording medium 26, at a head-to-surface spacing of 0.002 inch.

Although the magnetic recording heads in the accompanying figures are shown as ring magnets, they may preferably take an elongated form as illustrated in United States Patent 2,660,622, issued November 24, 1953, to W. J. Field et al.

The use of a revolving cylindrical drum as a magnetic storage medium has now become exceedingly common in the art. However, for the purposes of this invention, it will be obvious that equally convenient storage means will comprise either magnetic tapes running over reels, a continuously cycling magnetic belt, revolving discs, etc. All the above mentioned devices fall within the scope of the equipment with which this invention may operate satisfactorily.

The $A_1$ and $A_2$ current pulses are applied to the windings of the core 10 in an interleaved manner, that is, at times approximately 180° out of phase with there being, preferably, an intervening quiescent period as shown in Figure 3. In one exemplary application as shown in Figure 3, the $A_1$ pulses 30 are applied only when it is desired to write a "1," while the $A_2$ pulses 32 are applied in a continuous series. The core 10 acts as a gate with a substantial output current passing through diode 20 only when both an $A_1$ and an $A_2$ pulse have driven the core from the "0" state to the "1" state and back down to the "0" state again, the output pulse 34 occurring during the $A_2$ pulse period when diode 20 is polarized and the windings are wound on the core 10 as illustrated in Figure 2. The direction of current flow, the direction of the windings, and the polarization of diode 20 are relative and must be such as to give the desired output. Direction of current flow and of magnetization are indicated in Figure 2 by solid arrows for an $A_2$ pulse input, and by dotted arrows for an $A_1$ pulse input.

Alternatively, the arrangement may be changed so that the output current through diode 20 occurs substantially simultaneously with the $A_1$ signals. For example, if diode 20 is reversed in its connections, the new polarization thereof would allow an output current, induced in winding 16 by an $A_1$ pulse, to pass through the diode to the recording transducer 18 substantially simultaneously with the receipt of the $A_1$ pulse. As in the prior described modification, the output current will only be substantial and cause an effective recording on drum 26 if the state of core 10 was changed from negative to positive (or vice versa) in its magnetization. Consequently, with diode 20 reversed in its polarization, an $A_2$ pulse needs to precede an $A_1$ pulse before a "1" may be recorded on the drum 26.

In like manner, if the polarization of diode 20 is retained as shown in Figure 2, but the winding direction of both the control winding 12 and the driver winding 16 is reversed so that the driver winding 14 is wound oppositely to both the control and output windings 12 and 16, respectively, the output current will occur substantially simultaneously with an $A_1$ pulse at the control winding. However, if under these reversed winding conditions, the diode in the output line is also reversed, the output current will again occur substantially simultaneously with an $A_2$ pulse input to the driver winding.

For the purpose of the following discussion, it is assumed (without limitation thereto being intended) that the output is obtained during the $A_2$ pulse period. Therefore, in the assumed case, current generator 17 producing the $A_1$ pulse 30 needs only supply enough power to switch the core 10 to the "1" state, since the core 10 is unloaded during the application of the $A_1$ pulse 30 due to the high back-resistance of the diode 20 in the output winding 16. However, current generator 19 producing the driver or $A_2$ pulse 32 must supply power to switch the state of the core 10 with a load on the output winding consisting of the impedance of the recording head winding 24 and the forward resistance of the diode 20.

The current generators 17 and 19 supplying the $A_1$ and $A_2$ signals may comprise circuits employing either another saturable reactor, a transistor, a vacuum tube, or any other type of pulse-forming network. When the output occurs during an $A_2$ pulse period, the low power requirement for an $A_1$ pulse allows a transistor to be used in the $A_1$ pulse generator 17. The $A_2$ pulse in turn is best supplied by a vacuum tube generator. Since the $A_1$ pulse alone may control the writing operation, this invention allows a transistor to directly control a magnetic recording operation. Listed below are typical values for an embodiment of this invention using a General Ceramics and Steatite Corp. toroidal core type F259 Ferramic MF1118, and using a transistor in the $A_1$ signal source.

| | Turns | | Ma. peak |
|---|---|---|---|
| $A_1$ winding | 125 | $A_1$ pulse | 25 |
| $A_2$ winding | 50 | $A_2$ pulse | 500 |
| Output winding | 25 | Writing pulse | 645 |

For less writing current, the $A_2$ driver pulse current may be reduced accordingly. Since the $A_2$ driver current is comparatively small, several writing circuits similar to that of Figure 2 may be supplied by a single vacuum tube in a common current generator as shown in Figure 2A. This is particularly useful when the $A_2$ pulses recur periodically as illustrated in Figure 3. Figure 2A shows, as an example, three recording heads 18, 18′ and 18″ positioned adjacent their respective recording tracks on drum 26. Each head is supplied with current pulses by a saturable reactor writing circuit SR similar to that of Figure 2. Since heads 18, 18′, 18″ may be operating simultaneously while each records entirely different data than another, the control current generator sources are differently numbered, to wit: 17, 17′ and 17″. However, the current generator 19 may operate to supply all the saturable reactors SR with $A_2$ driving pulses, and, as mentioned above, one vacuum tube is capable of providing sufficient output current for several such reactors, no limitation to three such reactors being intended.

If an assumption opposite to the one above mentioned is made (that is, if the output current occurs during the $A_1$ pulse period instead of the $A_2$ pulse period), the situation will be reversed and current generator 17 will be presented with the greater load. In that case, current generator 19 may conveniently utilize a transistor to supply the $A_2$ pulses.

For the purpose of positive and selective writing or altering of a recorded bit on the drum, it is necessary to introduce a second saturable core, the output winding of which may be connected to a common transducer winding 24 (as shown in Fig. 4A), or to a second write-winding on the recording transducer (shown in Fig. 4B). Referring first to Figure 4A, a core 10 (similar in all respects to the core 10 of Fig. 1 with its windings 12, 14 and 16 and diode 20 being similarly orientated) is designated as the "1" core and the other core 38 is designated as the "0" core. The operation of the saturable reactor comprising core 38 is similar to the operation of the saturable reactor comprising core 10 as described for Figure 2. Separate control sources (not shown, but similar to current generator 17) for supplying control pulses $A_{11}$ and $A_{12}$ to control windings 12 and 35, respectively, are necessary to obtain the "0" and "1" output pulses, but the driver source (not shown, but similar to current generator 19) for supplying the $A_2$ pulses applied at terminals 40 may energize the driver windings 14 and 44 on both cores 10 and 38, respectively. Core 38 has an output winding 37, and, in the embodiment illustrated in Figure 4A, it is wound in the same direction as the driver winding 44, the control winding 35 being wound oppositely to both the output and driver windings 37 and 44. The respective windings then on core 38 are wound in the same direction as those on core 10. Diode 39 is connected in the output winding line and is polarized similarly to diode 20. Both output windings 16 and 37 are connected to the same winding 24 of transducer 18, the connection being not in series nor strictly in parallel since similar sides of each output winding are connected to opposite sides of the transducer winding 24; the connection is, therefore, termed herein "anti-parallel."

The control signals $A_{11}$ and $A_{12}$ are assumed to be positive pulses as was the assumption for the $A_1$ pulses for Figure 2. Again, however, no limitation thereto is intended. Since the systems illustrated in Figures 4A and 4B are for the purpose of either altering a prior recording or positively and selectively recording digital data, the $A_{11}$ and $A_{12}$ pulses (representing "1" and "0" inputs, respectively) should appear alternatively with one or the other appearing during the pulse periods reserved for $A_1$ pulses in Figure 3. The $A_2$ pulses for Figures 4A and 4B may recur continuously or periodically and in a time relationship with pulses $A_{11}$ and $A_{12}$ so as to be interleaved therewith.

Since the output windings 16 and 37 of Figure 4A are conected in anti-parallel relationship to transducer winding 24 (as hereinabove explained), the output currents passing through diodes 20 and 39 will set up substantially opposite flux orientations in transducer 18. However, the differently induced fluxes will not be in direct opposition time-wise since the control pulses $A_{11}$ and $A_{12}$ occur in the alternative, and only the output winding of that core which is set up in the proper state will cause an output to produce flux and "write" a pulse. A certain amount of loss in the recorded signal is encountered due to the addition of the second core, whether it is connected to the same winding or to another winding on the head as shown in Figure 4B.

Referring now to Figure 4B, it has been found that employing a recording transducer with two windings is the better system to use. The loss obtained is not excessive. The apparatus shown is similar in all respects to that in Figure 4A, except that output winding 16 of "1" core 10 is connected to winding 50 on recording head 52, while output winding 37 of "0" core 38 is connected to a different winding 58 on recording head 52. Windings 50 and 58, it will be noted, are wound in opposite directions, so that the flux orientations induced in head 52 as a result of $A_{11}$ and $A_{12}$ input pulses is the same as explained for Figure 4A.

A writing circuit embodying this invention operated at repetition rates up to 275,000 recordings per second. The magnetic core can be switched at a much higher rate if needed.

Although the driver windings 14 and 44 for both Figures 4A and 4B are shown connected in series, no limitation thereto is intended since they could as well be connected to the $A_2$ pulse source (not shown) in parallel. Also, as explained for the writing circuit illustrated in Figure 2, the source of $A_2$ pulses may comprise a single vacuum tube and may supply several sets of writing circuits (in the same manner as shown in Fig. 2A) of the type shown in either Figures 4A or 4B since their current demand is not excessive. For the same reasons that current generator 17 of Figure 2 could have a low power output and therefore utilize a transistor, the sources of pulses $A_{11}$ and $A_{12}$ may conveniently be only a transistor and attendant circuitry.

The above discussion of Figures 4A and 4B has impliedly assumed the output currents to the recording transducers occurred during the $A_2$ pulse period. However, as was described in detail for the apparatus of Figure 2, the output currents can be made to occur substantially simultaneously with the occurrence of an $A_{11}$ or $A_{12}$ pulse either by reversing the polarization of the output diodes or by reversing the winding direction of the control and driver windings.

Upon obtaining an understanding of the basic principles of the invention from the above described exemplary embodiments, it will be apparent that many different embodiments of the invention are possible without departing from the scope thereof. Therefore, it is intended that all matter contained in the above description and shown in the accompanying drawings shall be interpreted as illustrative and not limitative, the scope of the invention being defined by the appended claims.

What is claimed is:

1. In a pulse generating circuit, bistable saturable reactor means for storing and gating signals, said means having windings forming at least one output and at least two inputs, said output being coupled to either of said inputs only by said saturable reactor means, and a unidirectional device connected in series with said output, one of said inputs being connected to receive driving signals and another of said inputs being connected to receive data control signals interleaved in time with said driving signals, the arrangement being such that a substantial data output current passes through said unidirectional device only when both a driving and control signal occur.

2. Apparatus comprising a bistable saturable reactor having an output winding, a driver winding, and a control winding, all of said windings being coupled together only by said reactor, a recording transducer, a unidirectional current device serially coupling said output winding and transducer, a source of driving signals coupled to the driver winding, and a source of control signals coupled to the control winding, said control signals being interleaved in time with the driving signals, the arrangement being such that substantial output current passes through said unidirectional device to the transducer only when both a driving and control signal occur.

3. Apparatus as in claim 2 wherein said source of driving signals produces continuously recurring driving signals.

4. Apparatus as in claim 2 wherein said source of control signals comprises a transistor current generator.

5. Apparatus as in claim 2 wherein said source of driving signals comprises a single vacuum tube current generator.

6. Apparatus as in claim 2 further including at least one other bistable saturable reactor having output, driver, and control windings all intercoupled only by said reactor, a separate recording transducer and a unidirectional current device serially coupling the output winding and separate transducer, the driver winding of each saturable reactor being coupled to said one source of driving signals.

7. Apparatus as in claim 2 wherein said control winding is wound oppositely to both said driver and output windings.

8. Apparatus as in claim 7 wherein said unidirectional device is polarized so that said output current therethrough, if any, occurs substantially simultaneously with said driving signals.

9. Apparatus comprising two bistable saturable reactors each having an output winding, a driver winding, and a control winding, the driver windings being coupled only magnetically to the output windings, a load, two unidirectional devices serially coupling said output windings respectively to the load, a source of driving signals coupled to each of said driver windings, first and second sources of control signals coupled respectively to said control windings, the control signals from said first and second sources occurring alternately and being interleaved in time with said driving signals, the arrangement being such that substantial output current passes to the load through the unidirectional device associated with the saturable reactor which receives both a driving and control signal.

10. Apparatus as in claim 9 wherein said source of driving signals produces continuously recurring driving signals.

11. Apparatus as in claim 9 wherein said load is a recording transducer.

12. Apparatus as in claim 11 including means to cause the output currents through the respective unidirectional devices to set up substantially opposite flux orientations in the recording transducer in accordance with the control signals from said first and second sources respectively.

13. Apparatus as in claim 12 wherein said last mentioned means comprises a single winding on said recording transducer and each of said output windings are coupled to said single winding in anti-parallel relationship to each other.

14. Apparatus as in claim 12 wherein said last mentioned means comprises two oppositely wound windings on said recording transducer and said output windings are coupled respectively thereto.

15. Apparatus as in claim 9 wherein at least one of said first and second sources comprises a transistor current generator.

16. Apparatus as in claim 9 further including at least one other and separately operable set of apparatus substantially like that of claim 9, said sets of apparatus having coupled in common to their respective driver windings said source of driving signals.

17. In the pulse generating circuit, bistable saturable reactor means for storing and gating signals, said means having windings forming at least one output and at least two inputs, a load, a unidirectional current conducting device serially coupling said output with said load, a source of driving signals coupled to one of said inputs, and a source of control signals coupled to another of said inputs, said output being only magnetically coupled to the input receiving said driving signals, the arrangement being such that substantial output current passes through said unidirectional device only when both a driving and control signal have occurred.

References Cited in the file of this patent

UNITED STATES PATENTS

| | | |
|---|---|---|
| 2,709,798 | Steagall | May 31, 1955 |
| 2,719,773 | Karnaugh | Oct. 4, 1955 |
| 2,729,807 | Paivinen | Jan. 3, 1956 |
| 2,729,808 | Auerbach | Jan. 3, 1956 |